Dec. 26, 1950    F. P. KRUSE    2,535,293
TORQUE SCREW DRIVER OR THE LIKE
Filed Nov. 21, 1944
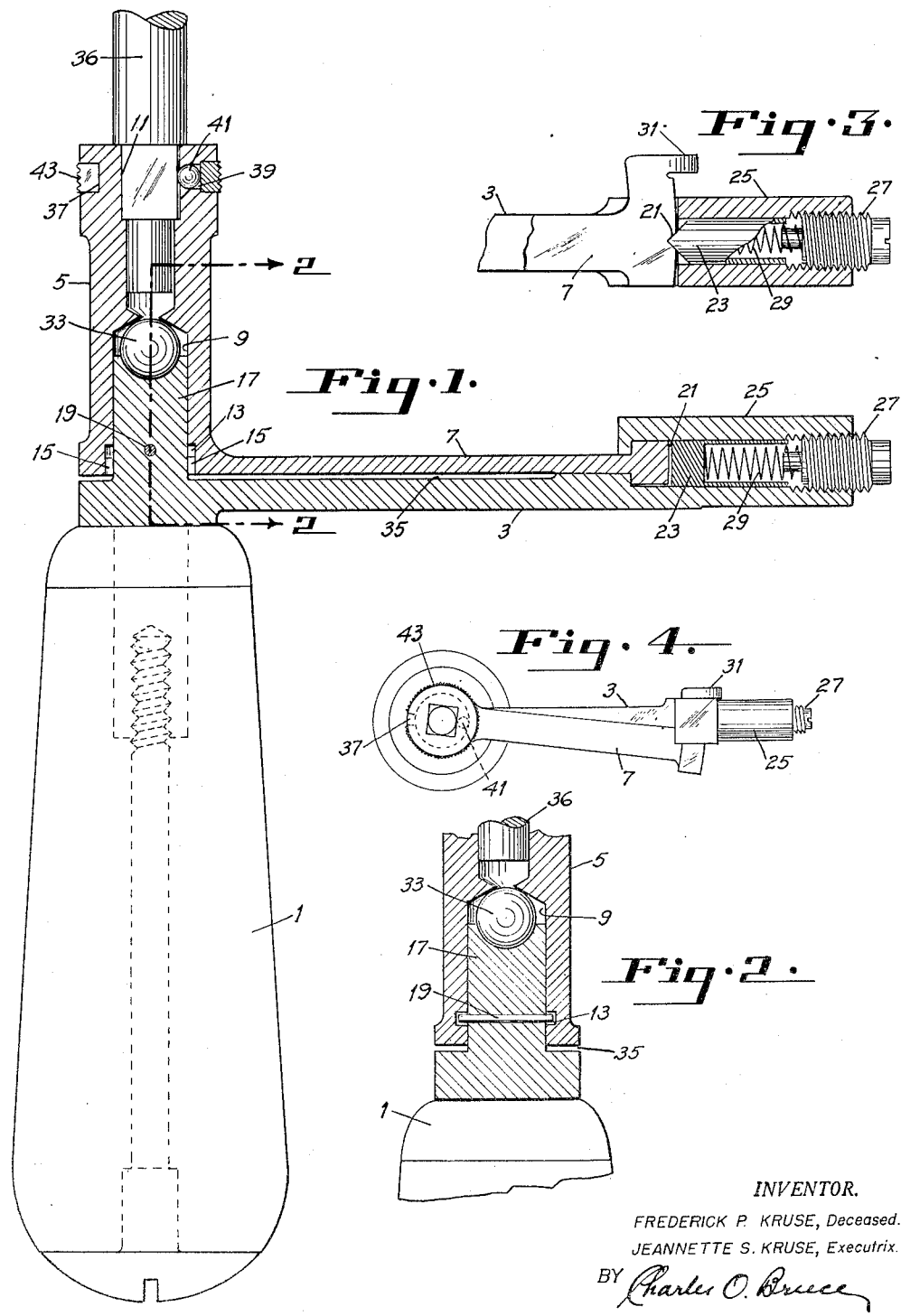
INVENTOR.
FREDERICK P. KRUSE, Deceased.
JEANNETTE S. KRUSE, Executrix.
BY Charles O. Bruce
ATTORNEY.

Patented Dec. 26, 1950

2,535,293

UNITED STATES PATENT OFFICE 2,535,293

TORQUE SCREW DRIVER OR THE LIKE

Frederick P. Kruse, deceased, late of Vallejo, Calif., by Jeannette S. Kruse, executrix, Albany, Calif., assignor, by direct and mesne assignments, of twenty per cent to Fred N. Kruse, Albany, Calif., forty per cent to Jeannette S. Kruse, and forty per cent to Charles O. Bruce Application November 21, 1944, Serial No. 564,537

10 Claims. (Cl. 81—52.4)

1

The invention of the present application relates to tools, and more particularly to a torque tool for limiting the torque applicable to a particular job on which the tool is used.

Among the objects of the invention are:

(1) To provide a novel and improved torque tool;

(2) To provide a novel and improved tool enabling the utilization of torque control where the use of the tool involves the application of compressive forces as well as torque, to the work;

(3) To provide a novel and improved torque tool wherein the torque applied to the handle will be transmitted substantially exclusively through the torque control regardless of the application of compressive forces to the handle of the tool;

(4) To provide a novel and improved torque tool in which compressive forces and torque applied to the tool handle will be effectively separated, and only the torque effect transmitted through the torque control.

Additional objects of the invention will be brought out in the following description of a preferred embodiment of the same, taken in conjunction with the accompanying drawings wherein:

Figure 1 is a view of the invention with the main portion in section;

Figure 2 is a sectional view in the plane of the line 2—2 of Figure 1;

Figure 3 is a fragmentary view partly in section of a detail of the torque control feature of the device of Figure 1, illustrating the same in holding position;

Figure 4 is a front elevational view of the device of Figure 1, illustrating the torque control feature in released position.

Referring to the drawings for a detailed description of a preferred embodiment of the invention, the device comprises a handle 1 having a laterally extending torque arm 3, and a shank 5 provided with a laterally extending torque arm 7. This shank is formed with a recess 9 at one end and a tool element receiving socket 11 at the other end, the recess including a circular groove 13 about the inner wall near the entrance to the recess and connecting with the entrance by a pair of diametrically located pin grooves 15.

The shank is rotatably assembled to the handle by providing the handle with a longitudinally extending stem 17 fitting into the recess 9, the stem being provided with a diametrically positioned cross-pin 19 engaging in the circular

2 groove 13 to hold the shank and handle in assembled relationship.

The pin grooves 15 render the circular groove 13 accessible to the pins 19, and with respect to the torque arms, the pin grooves are so located that the pins are receivable therein only when the torque arms are displaced approximately 90 degrees with respect to each other, so that when the shank is subsequently rotated to bring the torque arms in substantial alignment, the pins will be firmly disposed in the circular groove approximately 90 degrees from the pin grooves. Thus any possibility of accidental separation of the shank from the handle is eliminated.

The torque arms 3 and 7 at their extremities are releasably held together by means which will permit limited separation about the axis of the tool as a center, in response to the application of torque of a predetermined value to the handle. Such releasable holding is effected by arching the extremity of one of the torque arms such as torque arm 7 in the illustrated embodiment, and forming a notch 21 therein, and providing the other torque arm 3 at its extremity with a spring pressed pawl 23 enclosed in a housing 25 and adapted to engage in the notch 21.

A screw 27 threaded through the extremity of the housing 25 is adapted to engage the pawl spring 29. By rotation of this screw, the compression of the spring may be altered and, consequently, the torque responsive adjustment of the tool. The application of torque to the handle, when it reaches a certain predetermined value as fixed by the spring adjustment, will cause relative rotational separation of the torque arms, such separation being preferably limited as by the provision of a stop 31 on one of the torque arms disposed in the path of relative movement of the other torque arm.

In the use of the tool, as a screwdriver, for example, considerable pressure is applied to the handle, as well as torque. To achieve proper torque control in a tool of this kind, it is essential that such forces be separated, and that the torque effects be transmitted exclusively through the torque control and entirely independent of any compressive forces, regardless of the magnitude of such forces. Were this not the case, the operation of the torque control would then become a function, not only of the torque applied to the handle, but also of the compressive forces applied thereto, and under the circumstances, its utility would thereby be impaired.

To achieve separation of the compressive forces from the torque applied to the handle, an element with a spherical surface, such as a steel ball 33 is interposed between the end of the stem 17 which is hollowed out to receive the ball, and the bottom of the shank recess 9 which is preferably perforated, and the overall length of the stem and ball is designed to be slightly in excess of the depth of the recess, so that with the crosspin 19 riding freely in the circular groove 13, there will be a slight spacing 35 between the handle with its torque arm and the shank with its torque arm. Under these conditions, all compressive forces applied to the handle will be transmitted through the ball 33, and inasmuch as the ball provides for a minimum of friction, effectively all of the torque applied to the handle must be transmitted through the torque arms and the releasable holding means.

This feature is of extreme importance where pressure must be exerted on the handle of the tool when in use, for it permits of accurate calibration of the spring 29, with assurance that the pawl 23 will release at the predetermined value for which the spring is adjusted.

The ball and stem might be made integral but would not function quite as efficiently as when separate and apart from each other.

The length of the torque arms is somewhat significant, because the longer the arm, the lower need the spring pressure be to hold the arms in pawl engagement up to a predetermined value of applied torque to the handle. This means, of course, reduced wear between the pawl and the notched end of the pawl engaged arm, which wear would be so slight in any event, that it may be entirely disregarded when the torque arms are of a length comparable to that illustrated in the drawings. The ability to utilize a weaker spring, furthermore, makes it possible to achieve more sensitive and more accurate calibrations and adjustments.

An additional feature of the tool illustrated in the drawings, resides in the chuck associated with the socket end of the shank, for selectively receiving any one of a number of different tool elements 36. The socket 11 is preferably polygonal in cross-section and the socket portion of the shank is formed with an outside peripheral groove 37. A cylindrical hole 39 terminating spherically through one of the walls of the socket, in the plane of the groove 37 is adapted to loosely receive a pressure element preferably in the form of a small ball 41 of hardened steel, whose diameter is slightly in excess of the thickness of the wall at that point. Because of the spherical termination of the hole, the ball is adapted to protrude slightly through the wall of the socket when under pressure.

A split spring collar 43 of resilient material, having spaced ends, is disposed in the peripheral groove for shiftable movement therein, and for this purpose has its outer surface preferably knurled. With the spaced ends of the collar spanning the hole, the ball will, of course, be free of any pressure. If a tool element having an end formed to provide a complementary fit in the socket, is inserted in the socket, and the collar then rotatably shifted, the pressure upon the ball is caused to increase until the spaced ends of the collar are diametrically opposite the ball, in which position, maximum pressure will be exerted upon the ball. The ball, under these conditions, exerts maximum holding pressure against the tool element and thus serves to fix the same in the socket. When it is desired to replace the tool element, the collar is shifted back to its initial position to relieve the pressure on the ball and thereby facilitate the withdrawal of the tool element.

It is apparent, of course, that a tool element may be designed as an integral part of the shank, but the provision of a chuck in the shank as described, will, of course, considerably expand the field of usefulness of the tool.

While the invention has been disclosed in a preferred form and in considerable detail, it is apparent that the same is subject to variation and modification, without departing from the underlying principles thereof, and it is, accordingly, desired that the protection afforded the invention shall not be limited by such details, except as may be necessitated by the appended claims.

What is claimed is:

1. A torque screwdriver or the like requiring combined pressure and rotational forces in the use thereof, comprising a handle having torque means associated therewith, a shank having torque means associated therewith, means for rotatably assembling said shank to said handle in axial alignment therewith to transmit pressure to the work end of said screwdriver or the like, said last means including substantially frictionless pressure contact between said handle and said shank and permitting said torque means to be disposed adjacent each other, and means releasably holding said torque means against relative rotational movement and responsive to a predetermined torque applied to said handle to permit limited relative rotational movement of said torque means.

2. A torque screwdriver or the like requiring combined pressure and rotational forces in the use thereof, comprising a handle having a torque arm in a plane substantially normal to the axis of said handle, a shank having a torque arm, means for rotatably assembling said shank to said handle in axial alignment therewith to transmit pressure to the work end of said screwdriver or the like, said last means permitting said torque arms to be disposed adjacent each other, and means releasably holding said torque arms against relative rotational movement and responsive to a predetermined torque applied to said handle to permit limited relative rotational movement of said torque arms.

3. A torque screwdriver or the like requiring combined pressure and rotational forces in the use thereof, comprising a handle terminating in a laterally extending torque arm, a shank terminating in a laterally extending torque arm, means for rotatably assembling said shank to said handle on a common axis to transmit pressure to the work end of said screwdriver or the like, said last means permitting said torque arms to be disposed adjacent each other, and means releasably holding said torque arms against relative rotational movement and responsive to a predetermined torque applied to said handle to permit limited relative rotational movement of said torque arms.

4. A torque screwdriver or the like requiring combined pressure and rotational forces in the use thereof, comprising a handle terminating in a laterally extending torque arm, a shank terminating in a laterally extending torque arm, means for rotatably assembling said shank to said handle on a common axis including a stem on one extending into a recess in the other to transmit pressure to the work end of the said screwdriver or the like, said last means permitting said torque arms to be disposed adjacent each other, and means releasably holding said torque arms against relative rotational movement and responsive to a predetermined torque applied to said handle to permit limited relative rotational movement of said torque arms.

5. A torque screwdriver or the like requiring combined pressure and rotational forces in the use thereof, comprising a handle having a laterally extending torque arm; a shank having a laterally extending torque arm; means rotatably assembling said shank to said handle on a common axis to transmit pressure to the work end of said screwdriver or the like, said last means permitting said torque arms to be disposed adjacent each other; means releasably holding said torque arms against relative rotational movement and responsive to a predetermined torque applied to said handle to permit relative rotational movement of said torque arms, said means including a spring pressed pawl mounted on one of said torque arms and engaging the other torque arm; and means directing all torque applied to said handle in the use of said tool, exclusively through said torque arms and releasable holding means to said shank.

6. A torque tool comprising a handle having a longitudinally extending stem and laterally extending torque arm; a shank having a recess at one end to receive said stem, and a laterally extending torque arm, said recess including a circular groove in the wall thereof near the entrance thereto; a pin protruding from said stem into said groove, one of said torque arms having a notch at the end thereof; means rotatably assembling said shank to said handle, said means including a stem on said handle extending into said shank recess; means releasably holding said torque arms against relative rotational movement and responsive to a predetermined torque applied to said handle to permit limited relative rotational movement of said torque arms, said means including a spring pressed pawl mounted at the end of said other torque arm and engaging in said notch, and a stop on one of said torque arms in the path of relative movement of the other torque arm; and means directing all torque applied to said handle in the use of said tool, exclusively through said torque arms and releasable holding means to said shank.

7. A torque tool comprising a handle having a laterally extending torque arm; a shank having a recess at one end, and a laterally extending torque arm; means rotatably assembling said shank to said handle on a common axis, permitting said torque arms to be disposed adjacent each other, said means including a stem on said handle extending into said shank recess; means releasably holding said torque arms against relative rotational movement and responsive to a predetermined torque applied to said handle to permit limited relative rotational movement of said torque arms; and means causing substantially all torque applied to said handle in the use of said tool, to be transmitted exclusively through said torque arms and releasable holding means, said means including a ball disposed between the end of said stem and the bottom of said shank recess, said ball and stem having an overall length in excess of the depth of said recess.

8. A torque tool comprising a handle having a laterally extending torque arm; a shank having a recess at one end, a tool element receiving socket at its other end, and a laterally extending torque arm, said recess including a circular groove in the wall thereof near the entrance thereto; one of said torque arms having a notch at the end thereof; means rotatably assemblying said shank to said handle on a common axis, permitting said torque arms to be disposed adjacent each other, said means including a stem on said handle extending along said comon axis into said shank recess, and laterally extending pins on said stem engaging in said circular groove; means releasably holding said torque arms against relative rotational movement and responsive to a predetermined torque applied to said handle to permit limited relative rotational movement of said torque arms, said means including a spring pressed pawl mounted at the end of said other torque arm and engaging in said notch, and a stop on one of said torque arms in the path of relative movement of the other torque arm; and means causing substantially all torque applied to said handle in the use of said tool, to be transmitted exclusively through said torque arms and releasable holding means to said shank, said means including an element having a spherical surface, disposed between the end of said stem and the bottom of said shank recess, said element and stem having an overall length in excess of the depth of said recess.

9. A torque tool comprising a handle having a laterally extending torque arm; a shank having a recess at one end, a tool element receiving socket at its other end, and a laterally extending torque arm, said recess including a circular groove in the wall thereof near the entrance thereto and pin grooves extending from said circular groove to said recess entrance; one of said torque arms having a notch at the end thereof; means rotatably assembling said shank to said handle on a common axis, permitting said torque arms to be disposed adjacent each other, said means including a stem on said handle extending along said common axis into said shank recess, and laterally extending pins on said stem engaging in said circular groove; means releasably holding said torque arms against relative rotational movement and responsive to a predetermined torque applied to said handle to permit limited relative rotational movement of said torque arms, said means including a spring pressed pawl mounted at the end of said other torque arm and engaging in said notch, and a stop on one of said torque arms in the path of relative movement of the other torque arm; and means causing substantially all torque applied to said handle in the use of said tool, to be transmitted exclusively through said torque arms to said shank, said means including a ball disposed between the end of said stem and the bottom of said shank recess, said ball and stem having an overall length in excess of the depth of said recess.

10. A torque screw driver or the like requiring combined pressure and rotational forces in the use thereof, comprising a handle and a work end, means intermediate said handle and work end for separating said rotational forces from said pressure forces, and means responsive to said rotational forces to the exclusion of said pressure forces for indicating a predetermined limit of said rotational forces when reached in the use of said screw driver or the like.

JEANNETTE S. KRUSE,

*Executrix of the Estate of Frederick P. Kruse, Deceased.*

(References on following page)

REFERENCES CITED

The following references are of record in the file of this patent:

UNITED STATES PATENTS

| Number | Name | Date |
|---|---|---|
| 985,135 | Bigelow | Feb. 28, 1911 |
| 1,562,810 | Towl | Nov. 24, 1925 |
| 1,681,881 | Shaw | Aug. 21, 1928 |
| 2,157,574 | Siesel | May 9, 1939 |
| 2,172,561 | Kruse | Sept. 12, 1939 |
| 2,304,038 | Thompson | Dec. 1, 1942 |
| 2,320,360 | Grey | June 1, 1943 |
| 2,365,419 | Lockheed | Dec. 19, 1944 |
| 2,394,022 | Storrie | Feb. 5, 1946 |

FOREIGN PATENTS

| Number | Country | Date |
|---|---|---|
| 352,005 | Italy | Aug. 31, 1937 |